United States Patent
Burriesci et al.

(10) Patent No.: US 11,586,684 B2
(45) Date of Patent: *Feb. 21, 2023

(54) SERVING MULTIPLE CONTENT ITEMS RESPONSIVE TO A SINGLE REQUEST

(71) Applicant: Google LLC, Mountain View, CA (US)

(72) Inventors: Matthew Strecker Burriesci, Half Moon Bay, CA (US); David Kent German, Cambridge, MA (US); Mathieu Gagne, Somerville, MA (US); Michael Kleber, Newton, MA (US); Jonathan Frank Guarino, Cambridge, MA (US); Guy Maor, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 608 days.

This patent is subject to a terminal disclaimer.

(21) Appl. No.: 16/566,076

(22) Filed: Sep. 10, 2019

(65) Prior Publication Data

US 2020/0004793 A1  Jan. 2, 2020

Related U.S. Application Data

(63) Continuation of application No. 15/014,807, filed on Feb. 3, 2016, now Pat. No. 10,423,674.

(60) Provisional application No. 62/273,020, filed on Dec. 30, 2015.

(51) Int. Cl.
G06F 16/951 (2019.01)

(52) U.S. Cl.
CPC .................................. G06F 16/951 (2019.01)

(58) Field of Classification Search
CPC ........................................................ G06F 16/951
USPC ............................................................ 707/706
See application file for complete search history.

(56) References Cited

U.S. PATENT DOCUMENTS

| | | | |
|---|---|---|---|
| 8,229,915 B1 | 7/2012 | Lloyd et al. | |
| 8,386,588 B1 * | 2/2013 | Cooley | H04N 21/4826 725/86 |
| 8,583,579 B1 | 11/2013 | Seth et al. | |
| 8,635,542 B2 | 1/2014 | Hickman | |
| 8,688,669 B1 | 4/2014 | Bernstein | |

(Continued)

OTHER PUBLICATIONS

Non-Final Office Action on U.S. Appl. No. 15/014,807 dated Nov. 1, 2018 (25 pages).

(Continued)

*Primary Examiner* — Scott A. Waldron
(74) *Attorney, Agent, or Firm* — Dority & Manning, P.A.

(57) ABSTRACT

When a client device loads a resource, a request for a first content item for a first content item slot is transmitted to a content item selection system. The content item selection system uses a predictive model to determine a predicted content item slot based on a document object model position of the first content item slot and a URL of the resource or a publisher identifier. Parameters for the predicted content item slot are used to select a subsequent content item for the predicted content item slot. The first content item and the subsequent content item are transmitted to the client device responsive to the request. The subsequent content item includes metadata indicative of the parameters of the predicted content item slot to be matched to a subsequent content item slot of the resource.

16 Claims, 8 Drawing Sheets

(56) References Cited

U.S. PATENT DOCUMENTS

| | | |
|---|---|---|
| 8,862,564 B2 | 10/2014 | Lee et al. |
| 8,904,277 B2 | 12/2014 | Kroger et al. |
| 9,164,966 B1 | 10/2015 | Llach et al. |
| 9,355,186 B2 | 5/2016 | Khanna et al. |
| 2008/0104194 A1* | 5/2008 | Tsun .................. G06Q 30/0241 709/219 |
| 2009/0063262 A1* | 3/2009 | Mason .................. G06Q 30/02 705/14.54 |
| 2009/0158326 A1* | 6/2009 | Hunt ...................... G11B 27/34 725/38 |
| 2009/0198358 A1* | 8/2009 | Logan .................. G06F 16/639 700/94 |
| 2009/0287572 A1* | 11/2009 | Whelan .............. G06Q 30/0277 705/14.55 |
| 2010/0325255 A1* | 12/2010 | Cheung .................. H04L 67/18 709/223 |
| 2010/0325533 A1 | 12/2010 | Artz |
| 2011/0277024 A1 | 11/2011 | Begley et al. |
| 2012/0016749 A1 | 1/2012 | Lisbakken |
| 2012/0246017 A1 | 9/2012 | Kleber |
| 2012/0297308 A1 | 11/2012 | Anikul et al. |
| 2013/0144712 A1 | 6/2013 | Ruarte et al. |
| 2013/0246311 A1 | 9/2013 | Lee et al. |
| 2014/0052543 A1* | 2/2014 | Kim .................. G06Q 30/0241 705/14.69 |
| 2014/0095514 A1 | 4/2014 | Filev et al. |
| 2014/0180796 A1 | 6/2014 | Sas et al. |
| 2014/0180800 A1 | 6/2014 | Balseiro et al. |
| 2014/0181156 A1 | 6/2014 | Lucash et al. |
| 2014/0372202 A1* | 12/2014 | Hummel ............ G06Q 30/0242 705/14.41 |
| 2014/0372415 A1* | 12/2014 | Fernandez-Ruiz ... G06F 16/951 707/722 |

OTHER PUBLICATIONS

Notice of Allowance on U.S. Appl. No. 15/014,807 dated May 15, 2019 (10 pages).

* cited by examiner

SERVING MULTIPLE CONTENT ITEMS RESPONSIVE TO A SINGLE REQUEST

CROSS-REFERENCE TO RELATED PATENT APPLICATIONS

This application is a continuation of, and claims priority under 35 U.S.C. § 120, to U.S. patent application Ser. No. 15/014,807, Feb. 3, 2016, which claims priority to and benefit of U.S. Provisional Application No. 62/273,020, filed Dec. 30, 2015, the disclosure of each of which are hereby incorporated by reference in their entirety.

BACKGROUND

In a networked environment, such as the Internet or other networks, first-party content providers can provide information for public presentation on resources, for example webpages, documents, applications, and/or other resources. The first-party content can include text, video, and/or audio information provided by the first-party content providers via, for example, a resource server for presentation on a client device over the Internet. The first-party content may be a webpage requested by the client device or a stand-alone application (e.g., a video game, a chat program, etc.) running on the client device. Additional third-party content can also be provided by third-party content providers for presentation on the client device together with the first-party content provided by the first-party content providers. For example, the third-party content may be a public service announcement or advertisement that appears in conjunction with a requested resource, such as a webpage (e.g., a search result webpage from a search engine, a webpage that includes an online article, a webpage of a social networking service, etc.) or with an application (e.g., an advertisement within a game). Thus, a person viewing a resource can access the first-party content that is the subject of the resource as well as the third-party content that may or may not be related to the subject matter of the resource.

SUMMARY

Implementations described herein relate to serving multiple content items responsive to a single content item request with each of the multiple content items selected based on predictive data for subsequent content item slots co-occurring with the first content item slot of the content item request. That is, for a resource, such as a webpage, that has several content item slots, such as for serving advertisements or content recommendation units, the request for a first content item for the first content item slot may be used with a predictive model to predict the likelihood of co-occurrence of other content item slots for the resource and parameters of such other content item slots. When the resource is being loaded by a client device, a script may execute for a first content item slot that sends a request for a first content item for the first content item slot and for a set of subsequent content items. The script also creates an ephemeral state frame that stores the set of subsequent content items that are returned responsive to the request. The set of subsequent content items are selected based on parameters of predicted subsequent content item slots given the parameters of the first content item slot and the likelihoods of co-occurrence of subsequent content item slots using the predictive model. The predicted parameters for the subsequent content item slots are included as metadata with each corresponding subsequent content item. Responsive to the original single request, a content item selection system returns the first content item for display in the first content item slot along with the set of subsequent content items for the predicted subsequent content item slots and metadata for each subsequent content item that corresponds to the predicted parameters for the subsequent content item slots. The set of subsequent content items and metadata are stored in the ephemeral state frame.

As the client device loads the resource, each subsequent content item slot initially sends a query that includes the parameters of the subsequent content item slot to the ephemeral state frame to determine if the ephemeral state frame has a stored corresponding subsequent content item to be served for the subsequent content item slot. If the metadata for a stored corresponding subsequent content item matches the parameters of the subsequent content item slot of the query, then the corresponding subsequent content item is served and displayed in the subsequent content item slot without having to transmit a new request to the content item selection system. Thus, the set of corresponding subsequent content items stored in the ephemeral state frame can be retrieved and used to fill subsequent content item slots without sending multiple requests to the content item selection system.

One implementation relates to a method for serving multiple content items responsive to a single content item request. The method includes receiving a request for a first content item for a first content item slot of a resource. The request includes parameters for the first content item slot and a parameter indicating the request is for one or more serialized content items. The method also includes selecting a first content item based on the parameters for the first content item slot and determining a predicted subsequent content item slot based on an indexing value and a data structure responsive to the parameter indicating the content item request is for one or more serialized content items. The indexing value is based on a document object position of the first content item slot, and the data structure includes one or more probability values for one or more predicted subsequent content item slots. The method further includes determining one or more parameters for the predicted subsequent content item slot responsive to determining the predicted subsequent content item slot and selecting a subsequent content item for the predicted subsequent content item slot based on the determined one or more parameters for the predicted subsequent content item slot. The method still further includes transmitting data to effect presentation of the selected first content item, data to effect presentation of the subsequent content item for the predicted subsequent content item slot, and metadata associated with the subsequent content item. The metadata is indicative of the one or more parameters for the predicted subsequent content item slot.

In some implementations, the indexing value is further based on a URL for the resource or on a publisher identifier for the resource. In some implementations, selecting the subsequent content item for the predicted subsequent content item slot is further based on page level parameters received with the request for the first content item. In some implementations, the method further includes filtering a predicted subsequent content item slot from the one or more predicted subsequent content item slots of the data structure based on a predetermine threshold value for the one or more probability values. In some implementations, selecting the first content item based on the parameters for the first content item slot and selecting the subsequent content item for the predicted subsequent content item slot are performed in parallel. In some implementations, the method further includes determining a second predicted subsequent content item slot based on the indexing value and the data structure, determining one or more parameters for the second predicted subsequent content item slot responsive to determining the second predicted subsequent content item slot, and selecting a second subsequent content item for the second predicted subsequent content item slot based on the determined one or more parameters for the second predicted subsequent content item slot. The selecting of the first content item, the subsequent content item, and the second subsequent content item may be performed in parallel. In some implementations, the first content item and the subsequent content item are from the same third-party.

Another implementation relates to a system for receiving multiple content items responsive to a single content item request. The system may include one or more processors and one or more storage devices. The one or more storage devices includes instructions that cause the one or more processors to perform several operations. The operations include transmitting to a content item selection system a request for a first content item for a first content item slot of a resource. The operations also include receiving, responsive to the request for the first content item, a first content item for the first content item slot and a subsequent content item. The subsequent content item is associated with metadata indicative of the one or more parameters for a predicted subsequent content item slot. The operations further include determining the one or more parameters indicated by the metadata associated with the subsequent content item match parameters of a subsequent content item slot of the resource, and displaying the subsequent content item in the subsequent content item slot without transmitting a separate request to the content item selection system responsive to determining the one or more parameters indicated by the metadata match the parameters of the subsequent content item slot.

In some implementations, the operations further include generating an ephemeral state frame for the resource and storing data for the subsequent content item and the associated metadata in the ephemeral state frame. In some implementations, the ephemeral state frame is an iframe. In some implementations, the ephemeral state frame is generated responsive to execution of a script of the resource. In some implementations, the request for a first content item for the first content item slot includes a parameter indicating the request is for one or more serialized content items. In some implementations, the predicted subsequent content item slot is determined based on a predictive model. In some implementations, the operations further include determining a configuration file is included with data for the resource, determining the subsequent content item has not been received, and waiting a predetermined threshold period of time. The configuration file includes a parameter indicating subsequent content items are to be returned responsive to the request for a first content item.

Yet a further implementation relates to a computer readable storage device storing instructions that, when executed by one or more processors, cause the one or more processors to perform several operations. The operations may include receiving a request for a first content item for a first content item slot of a resource. The request includes parameters for the first content item slot. The operations also includes selecting a first content item based on the parameters for the first content item slot and determining a predicted subsequent content item slot based on an indexing value and a data structure. The indexing value is based on a document object position of the first content item slot, and the data structure includes one or more probability values for one or more predicted subsequent content item slots. The operations further includes determining one or more parameters for the predicted subsequent content item slot and selecting a subsequent content item for the predicted subsequent content item slot based on the determined one or more parameters for the predicted subsequent content item slot. The operations still further includes transmitting, responsive to the request for the first content item, data to effect presentation of the selected first content item, data to effect presentation of the subsequent content item for the predicted subsequent content item slot, and metadata associated with the subsequent content item. The metadata is indicative of the one or more parameters for the predicted subsequent content item slot.

In some implementations, the indexing value is further based on a URL for the resource or on a publisher identifier for the resource. In some implementations, selecting the first content item based on the parameters for the first content item slot and selecting the subsequent content item for the predicted subsequent content item slot are performed in parallel.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
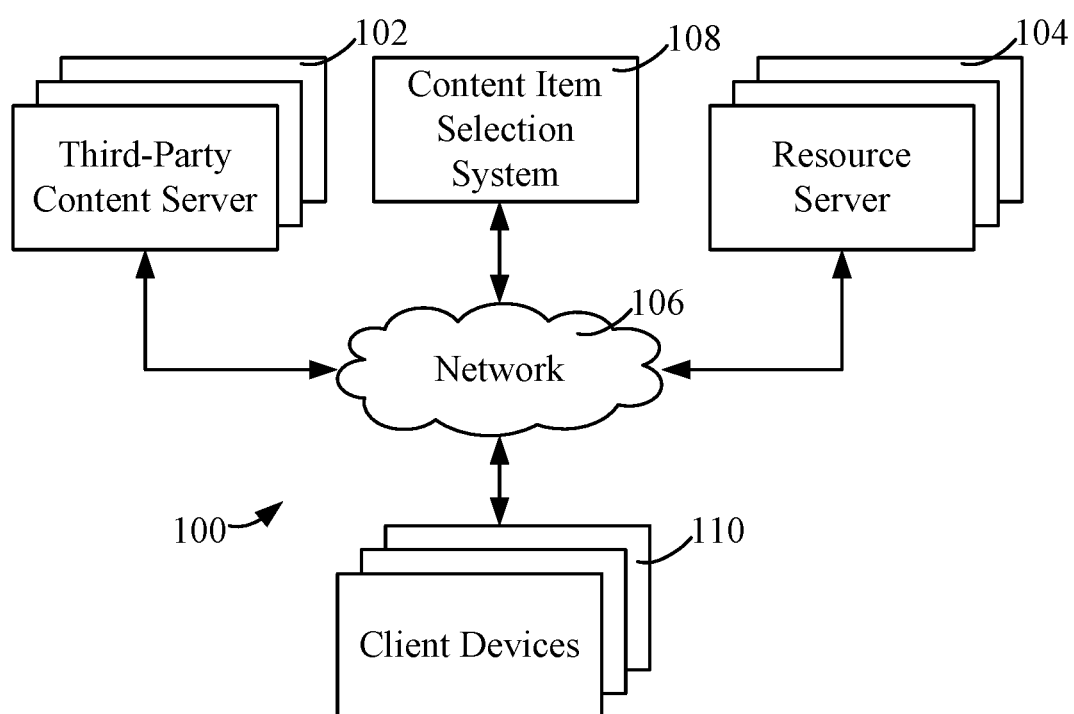
FIG. 1 is an overview depicting an implementation of a system of providing information via a computer network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Examples of specific implementations and applications are provided primarily for illustrative purposes.

A computing device (e.g., a client device) can view a resource, such as a webpage, a document, an application, etc. In some implementations, the computing device may access the resource via the Internet by communicating with a server, such as a webpage server, corresponding to that resource. The resource includes first-party content that is the subject of the resource from a first-party content provider and may also include additional third-party provided content, such as advertisements or other content. In one implementation, responsive to receiving a request to access a webpage, a webpage server and/or a client device can communicate with a data processing system, such as a content item selection system, to request a content item to be presented with the requested webpage, such as through the execution of code of the resource to request a third-party content item to be presented with the resource. The content item selection system can select a third-party content item and provide data to effect presentation of the content item with the requested webpage on a display of the client device. In some instances, the content item is selected and served with a resource associated with a search query response. For example, a search engine may return search results on a search results webpage and may include third-party content items related to the search query in one or more content item slots of the search results webpage.

The computing device (e.g., a client device) may also be used to view or execute an application, such as a mobile application. The application may include first-party content that is the subject of the application from a first-party content provider and may also include additional third-party provided content, such as advertisements or other content. In one implementation, responsive to use of the application, a resource server and/or a client device can communicate with a data processing system, such as a content item selection system, to request a content item to be presented with a user interface of the application and/or otherwise. The content item selection system can select a third-party content item and provide data to effect presentation of the content item with the application on a display of the client device.

In some instances, a device identifier may be associated with the client device. The device identifier may be a randomized number associated with the client device to identify the device during subsequent requests for resources and/or content items. In some instances, the device identifier may be configured to store and/or cause the client device to transmit information related to the client device to the content item selection system and/or resource server (e.g., values of sensor data, a web browser type, an operating system, historical resource requests, historical content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for presentation with a resource. For example, a third-party content provider may place a bid in the auction that corresponds to an agreement to pay a certain amount of money if a user interacts with the provider's content item (e.g., the provider agrees to pay $3 if a user clicks on the provider's content item). In other examples, a third-party content provider may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system uses content item interaction data to determine the performance of the third-party content provider's content items. For example, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some instances, one or more performance metrics for the third-party content items may be determined and indications of such performance metrics may be provided to the third-party content provider via a user interface for the content item management account. For example, the performance metrics may include a cost per impression (CPI) or cost per thousand impressions (CPM), where an impression may be counted, for example, whenever a content item is selected to be served for presentation with a resource. In some instances, the performance metric may include a click-through rate (CTR), defined as the number of clicks on the content item divided by the number of impressions. Still other performance metrics, such as cost per acquisition (CPA), conversion rate (CVR), cost per click-through (CPC) (counted when a content item is clicked), cost per sale (CPS), cost per lead (CPL), effective CPM (eCPM), and/or other performance metrics may be used.

In some instances, a webpage or other resource (such as, for example, an application) includes one or more content item slots in which a selected and served third-party content item may be displayed. The code (e.g., JavaScript®, HTML, etc.) defining a content item slot for a webpage or other resource may include instructions to request a third-party content item from the content item selection system to be presented with the webpage. In some implementations, the code may include an image request having a content item request URL that may include one or more parameters (e.g., /page/contentitem?devid=abc123&devnfo=A34r0). Such parameters may, in some implementations, be encoded strings such as "devid=abc123" and/or "devnfo=A34r0."

The selection of a third-party content item to be served with the resource by a content item selection system may be based on several influencing factors, such as a predicted click through rate (PCT), a predicted conversion rate (pCVR), a bid associated with the content item, etc. Such influencing factors may be used to generate a value, such as a score, against which other scores for other content items may be compared by the content item selection system through an auction.

During an auction for a content item slot for a resource, such as a webpage, several different types of bid values may be utilized by third-party content providers for various third-party content items. For example, an auction may include bids based on whether a user clicks on the third-party content item, whether a user performs a specific action based on the presentation of the third-party content item, whether the third-party content item is selected and served, and/or other types of bids. For example, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For example, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or an normalized value, may be generated to be used in the auction based on the bid value and the probability or another modifying value. In the prior example, the value or score for a bid based on whether the third-party content item is selected and served may be $0.005*1.00=0.005 and the value or score for a bid based on whether a user performs a specific action may be $5*0.002=0.01. To maximize the income generated, the content item selection system may select the third-party content item with the highest value from the auction. In the foregoing example, the content item selection system may select the content item associated with the bid based on whether the user performs the specific action due to the higher value or score associated with that bid.

Once a third-party content item is selected by the content item selection system, data to effect presentation of the third-party content item on a display of the client device may be provided to the client device using a network.

I. Overview

In some instances, an initial content item request can be used to predict what parameters would be for a second and/or other subsequent content item request for a second and/or other subsequent content item slot that differ from the first content item request. Thus, when the initial content item request is received, content items for each content item slot can be selected such that multiple auctions can run upon receiving the first content item request to return multiple content items to fill the subsequent content item slots without needing to have subsequent content item requests sent to content item selection system. Thus, a single request can be sent from a client device when loading a resource and a first content item responsive to the single request along with a set of subsequent content items can be returned responsive to the request such that the client device may not need to submit subsequent requests for subsequent content item slots.

To select the set of subsequent content items, the content item selection system uses a predictive model to predict the parameters of subsequent content item slots based on data from the initial received request and historical browsing session data. The predictive model uses an indexing value or values from the first request to predict the likelihood of subsequent content item slots and parameters for the subsequent content item slots. In some implementations, the indexing value can include a document object model position of the initial content item slot and a uniform resource locator of the resource for the initial content item request (e.g., the indexing value may be [DOM_position, URL]). In other implementations, the indexing value can include a document object model position of the initial content item slot and an identifier for the publisher (e.g., [DOM_position, Publisher_ID]). Using the indexing value, the system can determine the likelihood of co-occurrences of subsequent content item slots with the first content item slot for which the request is sent.

The predictive model may include a table that stores parameters for the subsequent content item slots to predict the block level parameters (i.e., parameters that vary from slot to slot) that are likely for subsequent content item slots based on the first content item slot request. In some implementations, a threshold value is used such that only subsequent content item slots that have a likelihood of co-occurrence greater than the threshold value are used to select the set of subsequent content items. That is, when the first content item request is received, the predictive model is used to generate a percentage probability for a second content item slot having a corresponding set of block level parameters (e.g., a vector of various parameters, such as size, position in the document object model, settings of the publisher for the slot, parameter values for the slot, etc.). For instance, if, based on the initial request, the predictive model indicates that a second content item slot has an 80% likelihood of co-occurrence with the first content item slot of the initial content item request and the threshold value is 70%, then the system selects a second content item for the second content item slot based on the parameters of the second content item slot of the table.

If the percent probability exceeds the threshold value, then the block level parameters are combined with page level parameters (i.e., those common to content item requests for the same page, such as publisher ID, client ID, etc.) for an auction to select the second content item for the likely second content item slot. The predicted block level parameters for the predicted second content item slot can be included as metadata with the selected second content item when it is returned to the client device. Thus, when the content item selection system returns the first content item selected responsive to the initial content item request, the second content item selected based on the predictive model is also returned with the corresponding metadata to be used to match the second content item with a second content item slot of the resource if the parameters of the second content item slot substantially match the predicted parameters of the metadata included with the second content item.

When selected second content item for the predicted second content item slot is served with the metadata indicative of the predicted block level parameters, the selected content item and metadata are stored in an ephemeral state frame, which is an iframe for holding subsequent content items to be potentially served into subsequent content item slots of the resource. When the resource is rendering, JavaScript executing for the second and any other subsequent content item slots query the ephemeral state frame for content items having metadata parameters substantially matching the block level parameters of the requesting content item slot. If the metadata parameters substantially match the block level parameters of the requesting content item slot, then the corresponding content item is retrieved from the ephemeral state frame to be displayed in the requesting content item slot. If the block level parameters do not substantially match, then the subsequent content item slot transmits a request to the content item selection system to fill the content item slot.

By returning a set of subsequent content items based on predicting the parameters of the subsequent content item slots, the content item selection system may reduce the number of requests transmitted from the client device to the content item selection system by proactively selecting and serving subsequent content items when the initial content item request is received. Such a system may also reduce the latency for loading a resource by reducing the number of requests or connections for loading the data to display the resource and accompanying content. Furthermore, the selection of subsequent content items through predicting the parameters of subsequent content item slots can reduce selection criteria transmission and time by reusing selection criteria from the initial content item request (e.g., resource specific selection criteria and/or client identifier specific selection criteria). For instance, the content item selection system can perform parallel content item selection auctions using the resource specific and/or client identifier specific selection criteria of the initial content item request instead of running content item selection auctions for each subsequent content item request.

To generate the predictive model for the content item selection system, data logs for browsing sessions for a predetermined look-back window (e.g., the past 1 day, 3 days, 5 days, 7 days, 10 days, 15 days, 30 days, etc.) are accessed and each browsing session is parsed to extract the page views. For each page view, each content item request is separated out into the initial content item request and the subsequent content item requests. The block level parameters (e.g., content item slot dimensions, position of content item slot in document object model, content item slot unique identifier, publisher settings for the content item slot, text color for the content item slot, etc.) for each subsequent content item slot of a corresponding subsequent content item request are aggregated based on the first content item slot request for a page view and based on the indexing value. The aggregated block level parameters are used to develop aggregated statistical data for the block level parameters for each subsequent content item slot for a page view that begins with the first content item slot request. Using the aggregated statistical data, a predictive model is generated (e.g., using Bayesian estimation, etc.) for the indexed value of the first ad slot.

While the foregoing has provided an overview of a system for returning a set of subsequent content items for predicted subsequent content item slots based on an initial content item request, the following will provide further details of such a system.

FIG. 1 is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system, such as a content item selection system 108. The content item selection system 108 can include at least one logic device, such as a computing device having a data processor, to communicate via the network 106, for example with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor may process instructions and output data to effect presentation of one or more content items to the resource server 104 and/or the client device 110. In addition to the processing circuit, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as an advertisement server or otherwise.

The client device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The client device 110 can execute a software application (e.g., a web browser or other application) to retrieve content from other computing devices over network 106. Such an application may be configured to retrieve first-party content from a resource server 104. In some cases, an application running on the client device 110 may itself be first-party content (e.g., a game, a media player, etc.). In one implementation, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a resource server 104). The other device may then provide web page data and/or other data to the client device 110, which causes visual indicia to be displayed by the display of the client device 110. Accordingly, the browser window displays the retrieved first-party content, such as web pages from various websites, to facilitate user interaction with the first-party content.

The resource server 104 can include a computing device, such as a server, configured to host a resource, such as a web page or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to effect presentation of a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for example, graphical, text, image, audio, video, etc. The content items may also be a combination (hybrid) of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, the content item selection system 108 can receive, via the network 106, a request for a content item to present with a resource. The received request may be received from a resource server 104, a client device 110, and/or any other computing device. The resource server 104 may be owned or ran by a first-party content provider that may include instructions for the content item selection system 108 to provide third-party content items with one or more resources of the first-party content provider on the resource server 104. In one implementation, the resource may include a web page. The client device 110 may be a computing device operated by a user (represented by a device identifier), which, when accessing a resource of the resource server 104, can make a request to the content item selection system 108 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the content item selection system 108 receives can include a HyperText Transfer Protocol (HTTP) cookie which contains a device identifier (e.g., a random number) that represents the client device 110. In some implementations, the device information and/or the resource information may be appended to a content item request URL (e.g., contentitem.item/page/contentitem?devid=abc123&devnfo=A34r0). In some implementations, the device information and/or the resource information may be encoded prior to being appended the content item request URL. The requesting device information and/or the resource information may be utilized by the content item selection system 108 to select third-party content items to be served with the requested resource and presented on a display of a client device 110.

In some instances, a resource of a resource server 104 may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a client device 110. The search results may include web page titles, hyperlinks, etc. One or more third-party content items may also be presented with the search results in a content item slot of the search result web page. Accordingly, the resource server 104 and/or the client device 110 may request one or more content items from the content item selection system 108 to be presented in the content item slot of the search result web page. The content item request may include additional information, such as the user device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the third-party content provider may manage the selection and serving of content items by content item selection system 108. For example, the third-party content provider may set bid values and/or selection criteria via a user interface that may include one or more content item conditions or constraints regarding the serving of content items. A third-party content provider may specify that a content item and/or a set of content items should be selected and served for user devices 110 having device identifiers associated with a certain geographic location or region, a certain language, a certain operating system, a certain web browser, etc. In another implementation, the third-party content provider may specify that a content item or set of content items should be selected and served when the resource, such as a web page, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item, whether the third-party content item is selected and served, and/or other types of bids.

While the foregoing has provided an overview of a system 100 for selecting and serving content items to client devices 110, implementations of systems for returning a set of subsequent content items for predicted subsequent content item slots based on an initial content item request will now be described in reference to FIGS. 2-7.

Figure 2:
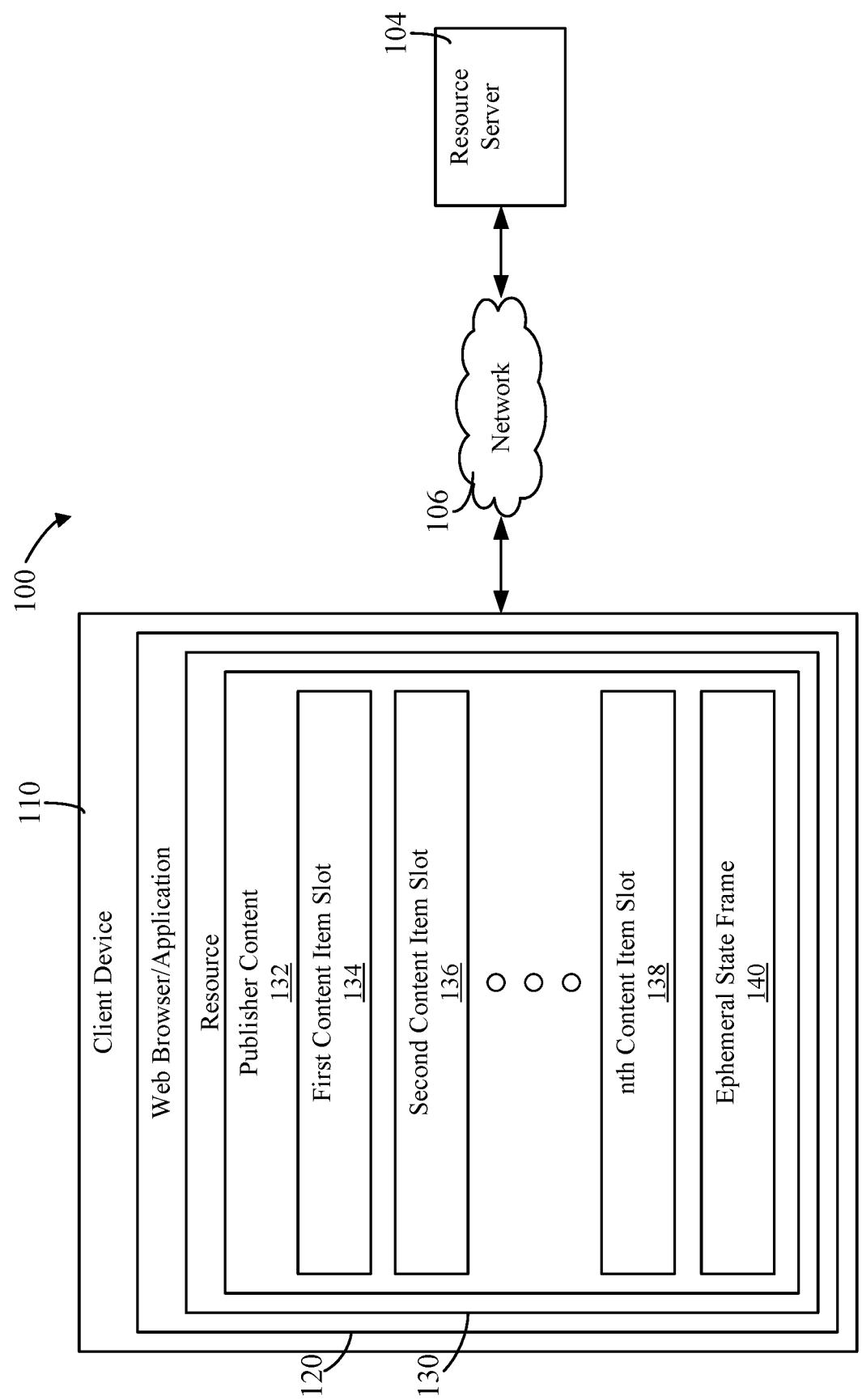
FIG. 2 is a block diagram depicting a client device communicating with a resource server over a network to display a resource on the client device.

II. Implementations of Systems for Serving Multiple Content Items Based on a Single Request FIG. 2 depicts an implementation of a client device 110 communicating over a network 106 with a resource server 104. The client device 110 may be any number of different types of user electronic devices configured to communicate via the network 106 (e.g., a laptop computer, a desktop computer, a tablet computer, a smartphone, a digital video recorder, a set-top box for a television, a video game console, combinations thereof, etc.). The client device 110 includes a processor and a memory. The memory may store machine instructions that, when executed by the processor, cause the processor to perform one or more of the operations described herein. The processor may include one or more microprocessors, application specific integrated circuits (ASICs), field programmable gate arrays (FPGAs), other forms of processing circuits, or combinations thereof. The memory may include, but is not limited to, electronic, optical, magnetic, or any other storage or transmission device capable of providing the processor with program instructions. The memory may include storage devices such as a floppy disk, CD-ROM, DVD, magnetic disk, memory chip, ROM, RAM, EEPROM, EPROM, flash memory, optical media, or any other suitable memory from which the processor can read instructions. The processor and the memory may form a processing module.

The client device 110 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of the client device 110 (e.g., a built-in display, microphone, etc.) or external to the housing of the client device 110 (e.g., a monitor connected to the client device 110, a speaker connected to the client device 110, etc.), according to various implementations. For example, the client device 110 may include an electronic display, which may display webpages, user interfaces for applications, and/or and other displays. In various implementations, the display may be located inside or outside of the same housing as that of the processor and/or the memory. For example, the display may be an external display, such as a computer monitor, television set, or any other stand-alone form of electronic display. In other examples, the display may be integrated into the housing of a laptop computer, mobile device, smartphone, tablet, or other form of computing device having an integrated display.

The client device 110 can execute a web browser or other application 120 to request and receive data over the network from the resource server 104 and/or a content item selection system, such as content item selection system 108 of FIG. 1. For instance, as shown in FIG. 2, the client device 110 may request data for a resource 130 from the resource server 104 over the network 106. The client device 110 can then display the resource 130 based on the received data, such as a webpage shown via a web browser and/or another interface via an application executing on the client device 110. The data for the resource 130 can include data for publisher content 132, such as content provided by the resource server 104, and one or more content item slots 134, 136, 138 in which third-party content may be displayed with the publisher content 132. In some implementations, the third-party content may include advertisements that are shown with the publisher content 132. The third-party content can be requested from a different source than the resource server 104, such as the content item selection system 108 of FIG. 1, or the third-party content may be received with the data for the resource 130 from the resource server 104.

In some implementations, the one or more content item slots 134, 136, 138 may be defined by a reference to an executable script in the data for the resource 130 such that, when that portion of the data for the resource 130 is processed by the client device 110, the executable script is executed by the client device 110. In some instances, the executable script transmits a request for a content item for the corresponding content item slot 134, 136, 138 to a content item selection system for a content item to be selected based on one or more parameters of the content item slot 134, 136, 138, the publisher content 132, the resource 130, and/or data associated with the client device 110. In some implementations, the one or more parameters may be appended to a content item request URL (e.g., contentitem.item/page/contentitem?devid=abc123&devnfo=A34r0&resnfo=N6F2w). The executable script may also create an iframe in which the returned content item is displayed and/or may create an ephemeral state frame 140, as described in greater detail below.

In the implementations described herein, the script for the first content item slot 134 can further include a parameter with the content item request to indicate that serialized content items are requested for the resource 130. The executed script transmits the first content item request to the content item selection system and, in response, receives a first content item to be displayed in the first content item slot 134 as well as a set of subsequent content items with associated metadata, as will be described in greater detail herein. In some implementations, the received first content item may include an HTML document that has an additional script that is executed by the client device 110. The additional script, when executed, can generate an ephemeral state frame 140, store the set of subsequent content items and associated metadata in the ephemeral state frame 140, invoke one or more callbacks to and subsequent content item slots 136, 138 that may have already executed, and render the first content item in the first content item slot 134. In some implementations, the ephemeral state frame 140 may be created by the executable script for the first content item slot 134 and/or via another executable script for the resource 130.

The ephemeral state frame 140 is a cacheable frame in which the received set of subsequent content items and associated metadata are stored and used to fill one or more subsequent content item slots 136, 138 of the resource without needing a separate request to be transmitted to the content item selection system from the client device. In some implementations, the ephemeral state frame 140 is an iframe such that the stored set of subsequent content items and associated metadata are accessible only by subsequent executable scripts for the one or more subsequent content item slots 136, 138.

If an executable script for the second content item slot 136 is executed (e.g., as the resource 130 is loading on the client device 110) and the set of subsequent content items and associated metadata have been received by the client device 110 and are stored in the ephemeral state frame 140, then the script for the second content item slot 136 is configured to query the ephemeral state frame 140 for a content item based on the parameters for the second content item slot 136. If the ephemeral state frame 140 contains a subsequent content item of the set of subsequent content items with matching or substantially matching parameters in the associated metadata to the parameters for the second content item slot 136, then the script for the second content item slot 136 retrieves the corresponding content item from the ephemeral state frame 140 to be rendered in the second content item slot 136.

In some implementations, the subsequent content item will match or substantially match if all the parameters of the metadata match at least some of the parameters for the second content item slot 136. In some instances, the subsequent content item will match or substantially match if a certain set of one or more parameters of the metadata (e.g., dimensions of the predicted content item slot, etc.) match corresponding parameters for the second content item slot 136 even if some parameters of the metadata do not match. In some further instances, the subsequent content item will match or substantially match if a predetermined threshold number of one or more parameters of the metadata (e.g., dimensions of the predicted content item slot, etc.) match corresponding parameters for the second content item slot 136 even if some parameters of the metadata do not match.

If the ephemeral state frame 140 does not contain a subsequent content item of the set of subsequent content items with matching or substantially matching parameters in the associated metadata, then the script for the second content item slot 136 transmits a request to the content item selection system with the parameters for the second content item slot 136. The content item selection system then returns a selected content item to be displayed in the second content item slot 136.

If the executable script for the second content item slot 136 is executed and the set of subsequent content items and associated metadata have not been received by the client device 110 and stored in the ephemeral state frame 140 (e.g., due to latency between the client device 110 and the content item selection system, due to latency in the selection of the set of subsequent content items, etc.), then the script for the second content item slot 136 can be configured to wait for a response from the content item selection system to the first content item request or transmit a separate request to the content item selection system with the parameters for the second content item slot 136.

In some implementations, the executable script for the second content item slot 136 may request a configuration file for the resource 130 to determine whether the first content item request will return subsequent content items for the subsequent content item slots. If the configuration file does not include an indication (e.g., a parameter or flag) that the first content item request will return subsequent content items for the subsequent content item slots, then the executable script for the second content item slot 136 can transmit a separate request to the content item selection system with the parameters for the second content item slot 136. If the configuration file does include an indication (e.g., a parameter or flag) that the first content item request will return subsequent content items for the subsequent content item slots, then the executable script for the second content item slot 136 waits for a predetermined threshold period of time (e.g., 100 ms, 200 ms, 300 ms, 400 ms, 500 ms, 600 ms, 700 ms, 800 ms, 900 ms, 1 s, etc.) before transmitting a separate request to the content item selection system with the parameters for the second content item slot 136.

As the resource 130 continues to load on the client device 110, subsequent content item slots up to an nth content item slot 138 execute corresponding scripts to determine if the set of subsequent content items and associated metadata have been received by the client device 110 and are stored in the ephemeral state frame 140 in a similar manner to that described above in reference to the second content item slot 136.

Figure 3:
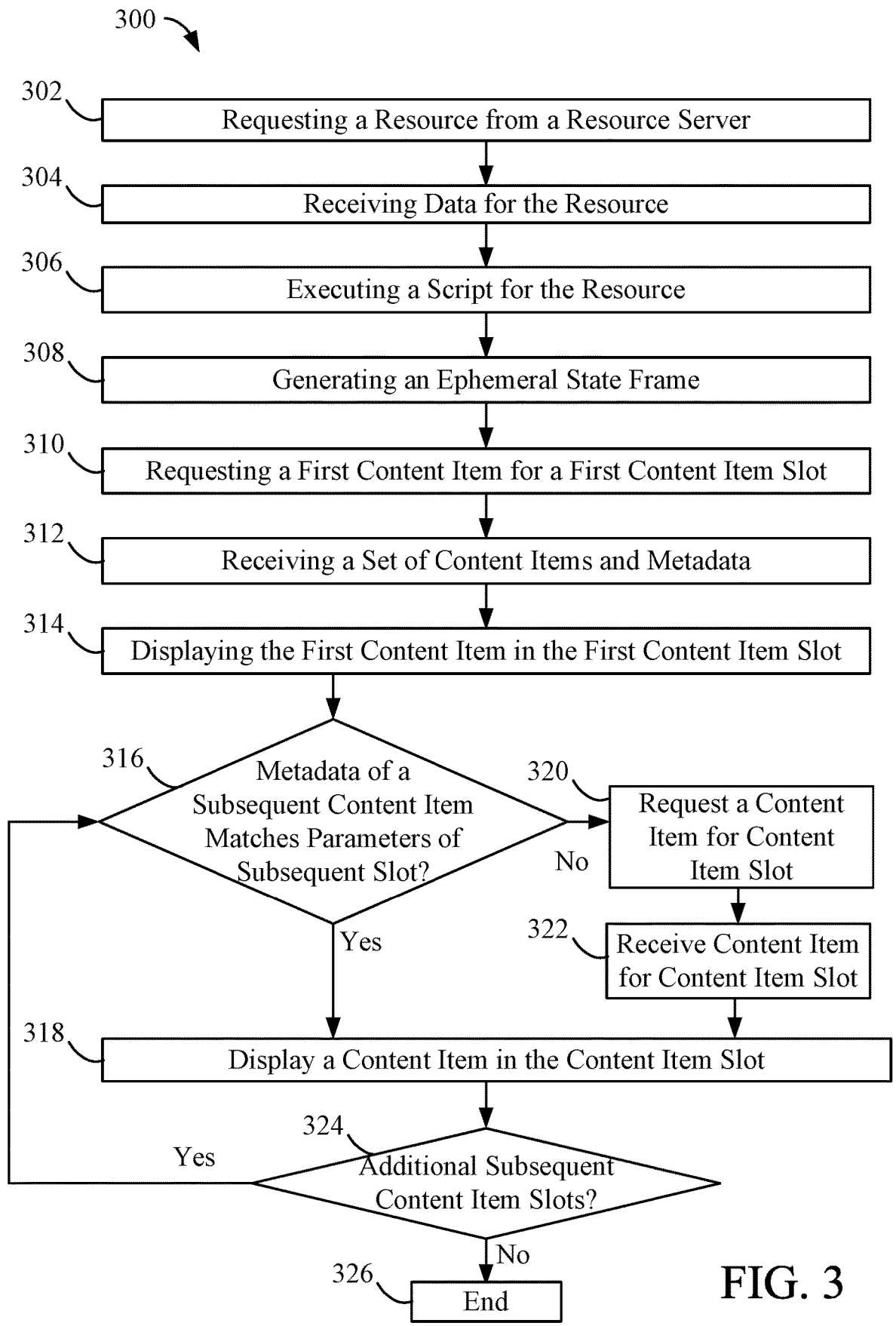
FIG. 3 is a process diagram depicting a process for a client device for displaying content items with a resource.

FIG. 3 depicts an example process 300 for a client device, such as client device 110 of FIGS. 1-2, to request, receive, and display multiple content items for subsequent content item slots of a resource. The process includes requesting a resource from a resource server (block 302). In some instances, the request for the resource from the resource server can be transmitted from a web browser executing on the client device when a user enters a URL into the web browser. In some other instances, the request for the resource from the resource server can be transmitted from another application executing on the client device responsive to an input (e.g., a selection of a button, an opening of the application, etc.).

The process 300 includes receiving data for the resource (block 304). The client device receives the data for the resource from the resource server over a data network and begins to display the resource in accordance with the received data. The process 300 also includes executing a script for the resource (block 306). As the data for the resource is processed by one or more processors of the client device, the data for the resource may contain a script or other executable instruction that is executed by the client device. For instance, the data for the resource may include one or more content item slots in which third-party content may be displayed with the content of the resource. In some implementations, the execution of the script may be a single script for the resource (e.g., a single script that is initially executed) and/or the execution of the script may occur for each one or more of the one or more content item slots (e.g., each of the one or more content item slots includes a call to a script).

The process 300 further includes generating an ephemeral state frame (block 308). In some implementations, the execution of the single script may generate the ephemeral state frame as the resource is loading. In other implementations, the script for the one or more of the content item slots may generate the ephemeral state frame. In still other implementations, a script returned as part of an HTML document responsive to a first content item request may generate the ephemeral state frame.

The generated ephemeral state frame is a cacheable frame in which a received set of subsequent content items and associated metadata are stored and used to fill one or more subsequent content item slots of the resource without needing a separate request to be transmitted to the content item selection system from the client device. In some implementations, the ephemeral state frame is an iframe such that the stored set of subsequent content items and associated metadata are accessible only by executable script called by the one or more subsequent content item slots.

The process 300 also includes requesting a first content item for a first content item slot (block 310). The first content item slot may be defined by a reference to an executable script in the data for the resource such that, when that portion of the data for the resource is processed by the client device, the executable script is executed by the client device. The executable script transmits a request for a content item for the first content item slot to a content item selection system for a content item to be selected based on one or more parameters of the first content item slot, the resource content, the resource, and/or data associated with the client device. In some implementations, the one or more parameters may be appended to a content item request URL (e.g., contentitem.item/page/contentitem?devid=abc123&devnfo=A34r0&resnfo=N6F2w) The executable script may also create an iframe in which the returned content item is displayed. In some implementations, the request for the first content item slot can further include a parameter with the content item request to indicate that serialized content items are requested for the resource.

The process 300 further includes receiving a set of content items and metadata (block 312). As will be described in greater detail herein, the content item selection system selects a first content item for the first content item slot responsive to the content item request based on the parameters for the first content item slot that are included with the request. If the first content item request also includes the parameter indicating that serialized content items are requested for the resource, then the content item selection system selects a set of subsequent content items for predicted subsequent content item slots for the resource based on a predictive model and the parameters included in the first content item request. As will also be discussed in further detail below, the content item selection system includes metadata with each of the set of subsequent content items, and the metadata that is indicative of the parameters corresponding to the predicted subsequent content item slot for each subsequent content item. The set of content items can include the first content item and/or the set of subsequent content items. The set of content items and metadata can be received from the content item selection system, over a data network and by the client device, responsive to the first content item request. The set of subsequent content items are stored in the generated ephemeral state frame with each subsequent content items corresponding metadata.

The process 300 further includes displaying the first content item in the first content item slot (block 314). When the first content item is received by the client device, either as part of the received set of content items and/or separately, the client device displays the first content item in the first content item slot with the content for the resource. In some implementations, if the first content item slot is at a position that is not within the viewport of the client device when the resource is initially displayed, then the first content item may be stored by the client device and displayed when the first content item slot is moved into the viewport of the client device.

The process 300 includes determining if metadata of a subsequent content item matches parameters of the subsequent content item slot (block 316). As the data for the resource is processed by the client device, additional content item slots for the resource, such as second content item slot 136 through nth content item slot 138 of FIG. 3, may be processed. Such content item slots can include corresponding scripts and/or calls to a script for a content item to be presented in such subsequent content item slots. In some implementations, the script may initially determine if a configuration file is included with the data for the resource and/or if a parameter is set for the configuration file and/or in the call for the first content item request to determine if subsequent content items are to be returned responsive to the first content item request. If the configuration file and/or parameter is not present and/or has a value indicating that no subsequent content items will be returned responsive to the first content item request, then the script causes the client device to transmit a request to the content item selection system with the parameters for a content item to be displayed in the subsequent content item slot.

If the parameter is present and has a value indicating that subsequent content items will be returned responsive to the first content item request, then the script determines if the ephemeral state frame contains the set of subsequent content items. If the ephemeral state frame does not contain the set of subsequent content items, the script may, in some instances, waits or dwells for a predetermined threshold period of time (e.g., 100 ms, 200 ms, 300 ms, 400 ms, 500 ms, 600 ms, 700 ms, 800 ms, 900 ms, 1 s, etc.) for the set of subsequent content items to be returned responsive to the first content item request. If the threshold period of time elapses and the set of content items have not been received and stored in the ephemeral state frame, then the script causes the client device to transmit a request to the content item selection system with the parameters for a content item to be displayed in the subsequent content item slot.

If the set of content items have been received and stored in the ephemeral state frame, either before or during the dwell period, then the script compares the parameters of the subsequent content item slot to the data indicative of the predicted parameters contained in the metadata for the set of subsequent content items stored in the ephemeral state frame to determine if metadata of a subsequent content item matches or substantially matches the subsequent content item slot. In some implementations, the comparison may compare a prioritized set of parameters (e.g., unique slot identifier parameters, dimension parameters, etc.) to initially include and/or exclude non-conforming predicted subsequent content items. In other implementations, the comparison may compare all the parameters of the subsequent content item slot to all the parameters of the metadata. In some implementations, the subsequent content item will match or substantially match if all the parameters of the metadata match at least some of the parameters for the subsequent content item slot (e.g., the number of parameters for the subsequent content item slot may be less than the number of parameters for the metadata). In some instances, the subsequent content item will match or substantially match if a certain set of one or more parameters of the metadata (e.g., dimensions of the predicted subsequent content item slot, etc.) match corresponding parameters for the subsequent content item slot even if some parameters of the metadata do not match. In some further instances, the subsequent content item will match or substantially match if a predetermined threshold number of one or more parameters of the metadata match corresponding parameters for the subsequent content item slot even if some parameters of the metadata do not match.

If the metadata of a subsequent content item matches or substantially matches the parameters of the subsequent content item slot, then the process 300 proceeds to retrieve the data for the matching subsequent content item from the ephemeral state frame and displays the content item in the content item slot (block 318). If the metadata of a subsequent content item does not match or substantially match the parameters of the subsequent content item slot, then the process 300 includes the script causing the client device to transmit a request to the content item selection system with the parameters for a content item to be displayed in the subsequent content item slot (block 320). The client device receives the content item for the content item slot (block 322) and then displays the content item in the content item slot (block 318).

As the resource is processed and loaded by the client device, if there are additional subsequent content item slots (block 324), the process 300 may return to determine if metadata of a subsequent content item matches the parameters of a subsequent content item slot (block 316). If there are no additional subsequent content item slots (block 324) to be processed, then the process 300 ends (block 326).

In some implementations, if the set of subsequent content items were not received and the process 300 proceeds to process another subsequent content item slot, then the process 300 may wait for an additional predetermined threshold period of time for another subsequent content item slot. In other implementations, the process 300 may instead directly proceed to requesting a content item for the subsequent content item slot (block 320) instead of waiting for the predetermined threshold period of time and/or returning to determining if metadata of a subsequent content item matches the parameters of the next subsequent content item slot (block 316).

In some implementations, the request for the first content item for the first content item slot (block 310) and/or the receiving of the set of content items and metadata (block 312) and/or the displaying of the first content item in the first content item slot (block 314) may occur before or substantially concurrently in time with generating the ephemeral state frame (block 308).

Figure 4:
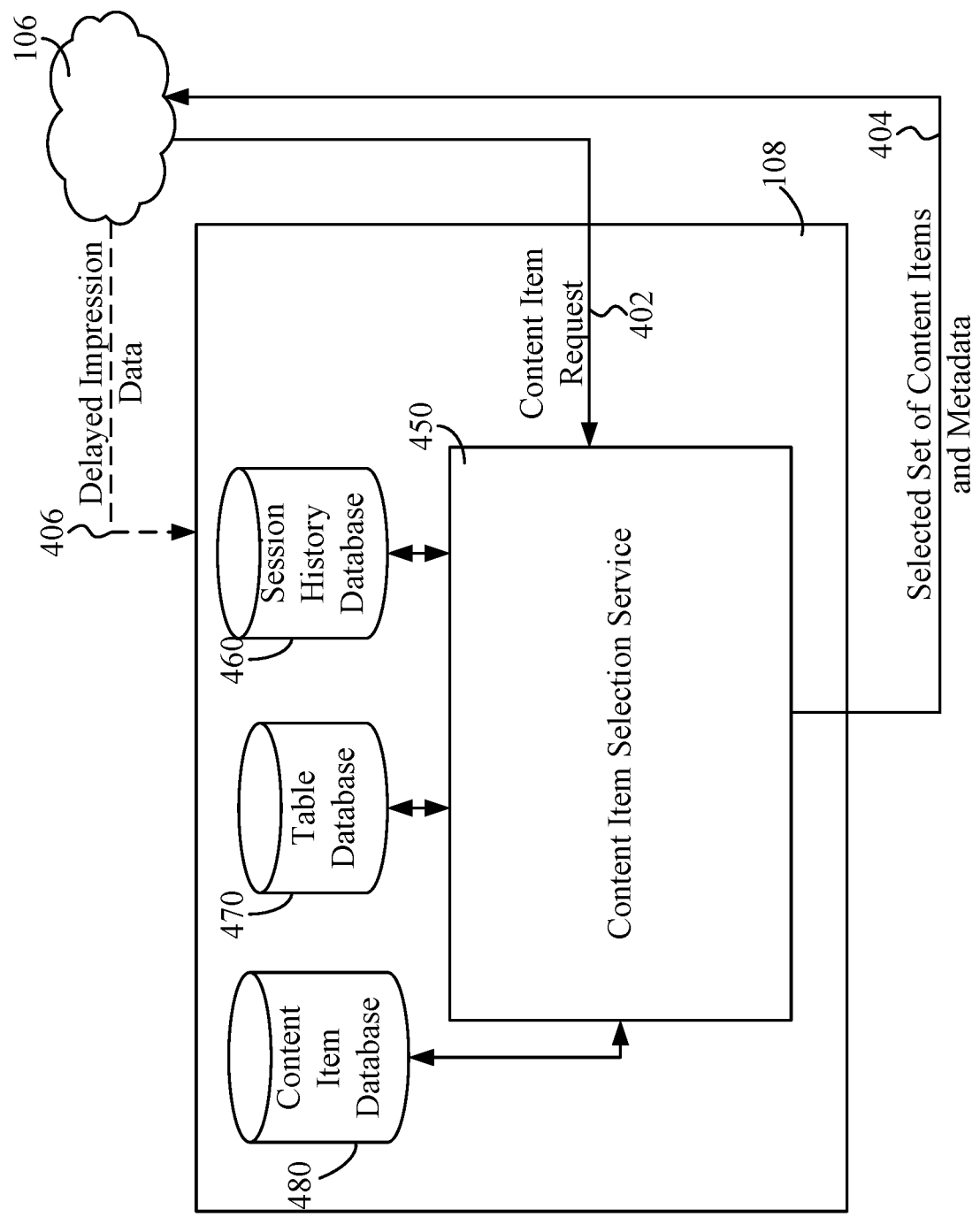
FIG. 4 is a block diagram depicting a content item selection system for selecting and serving content items for display with the resource at a client device.

FIG. 4 depicts an implementation of a content item selection system 108 that receives the first content item request and selects a first content item responsive to the request and a set of subsequent content items for predicted subsequent content item slots based on the parameters of the first content item request. The content item selection system 108 includes a content item selection service 450 and one or more databases, such as a session history database 460, a table database 470, and/or a content item database 480.

The content item selection service 450 is configured to receive a content item request 402 via the network 106. A client device, such as client device 110 of FIGS. 1-2 transmits the content item request 402 to the content item selection system 108 via the network 106. The content item request 402 may include one or more parameters representative of characteristics of the client device (e.g., a unique identifier associated with the client device, a type of client device, a display type of a client device, dimensions of the display, etc.), parameters associated with the content item request, (e.g., block level parameters such as content item slot dimensions, document object model position, etc.), a parameter indicative of a serialized content item request, and/or parameters of a resource with which the content item is to be presented (e.g., a URL of the resource, one or more keywords of the content of the resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.). In some implementations, the foregoing parameters may be appended to or included in a content item request URL (e.g., /page/contentitem?devid=abc123&devnfo=A34r0&resnfo=N6F2w).

Responsive to the content item request 402, the content item selection service 450 is configured to select and serve a set of content items and metadata 404 that includes a first content item for the first content item slot of a resource and a set of subsequent content items for predicted subsequent content item slots with metadata indicative of the parameters for each predicted subsequent content item slot. In some implementations, the content item selection service 450 is configured to perform an auction. That is, the content item selection service 450 may generate one or more values for one or more content items based, at least in part, on the parameters of the content item request 402 and/or the parameters of a predicted content item slot, and select one or more content items to be served. In some instances, the content item selection service 450 ranks the values (e.g., highest to lowest) and selects the content item associated with a value based on the ranking (e.g., selecting the content item associated with the highest ranked value). As will be described in greater detail herein, a predictive model may be used to predict a set of subsequent content item slots based on the parameters of the first content item request and session history from the session history database 460. In some implementations, the predictive model may be used to generate one or more tables to be stored and retrieved from the table database 470. The parameters for each of the predicted set of subsequent content item slots can then be used to select a subsequent content item from the content item database 480 for the predicted content item slot.

Data to effect presentation of each of the selected set of content items, including the first content item and the set of subsequent content items, and metadata for each of the set of subsequent content items 404 is transmitted or served by the content item selection service 450 to the client device via the network 106. The data can include graphical data, textual data, image data, audio data, video data, etc. that may be accessed from a database, such as the content item database 480 described herein.

The databases 460, 470, 480 shown in FIG. 4 may store data for and/or provide data to the content item selection service 450. The databases 460, 470, 480 may include a static storage device, such as ROM, solid state drive (SSD), flash memory (e.g., EEPROM, EPROM, etc.), magnetic disc, optical disc, etc., a plurality of static storage devices, a cloud storage system, a server, and/or any other electronic device capable of storing and providing data. While the implementation shown in FIG. 4 depicts the databases 460, 470, 480 as separate databases, it should be understood that the databases 460, 470, 480 may be combined into a single database or sets of databases.

The data stored in the session history database 460 may include data for one or more browsing session history logs that include data for one or more page views. The data for each page view includes data regarding the a publisher identifier, a URL, and parameters for each of the content item slots for the corresponding page (e.g., document object model position, content item slot dimensions, a content item slot unique identifier, settings for the publisher for the page, text color, text font, etc.). The data for the one or more browsing session history logs and/or one or more page views may be stored in the session history database 460 in a data structure, such as a data table. In some implementations, each page view may be separately stored in the session history database 460.

In some implementation, the data for one or more browsing session history logs that include data for one or more page views may be received with delayed impression data 406 and/or may otherwise be received by the content item selection system 108 to be stored in the session history database 460. The delayed impression data 406 may be transmitted from a client device, such as client device 110 of FIGS. 1-2, at the end of a page view and/or browsing session.

The table database 470 may store one or more data tables generated using a predictive model and based on the browsing session history. The one or more data tables are indexed based on a document object model position for a corresponding content item slot and a URL for the corresponding page pair and/or the document object model position for a corresponding content item slot and a publisher ID pair. For each index of the one or more data tables, the data table further includes data for one or more predicted content item slots and parameters associated with each of the one or more predicted content item slots. In some implementations, the data may further include a percentage and/or numerical value indicative of the probability of a corresponding predicted content item slot occurring with the indexed document object model positioned content item slot. The numerical value indicative of the probability may have a numerical value between 0, inclusive, and 1, inclusive.

That is, for an example index of data table for a content item slot A in a first document object model position that has 100 page views for a web site from publisher identifier ABC with an example URL, page.view, (e.g., the index would be [1, page.view] or [1, ABC]) which has co-occurrences of 100 instances with content item slot B, co-occurrences of 70 instances with content item slot C, and co-occurrences of 30 instances with content item slot D, then the corresponding data can include the parameters for content item slot B with a probability of 1.0 or 100%, the parameters for content item slot C with a probability of 0.7 or 70%, and the parameters for content item slot D with a probability of 0.3 or 30%. Thus, if a content item request is received from a client device that includes parameters indicative of a content item slot in the first document object position with a URL of page.view or a publisher identifier of ABC, then the corresponding data can be retrieved and used by the content item selection service 450 in predicting a set of predicted subsequent content item slots when the content item request is received, as will be discussed in greater detail herein. Of course it should be understood that the predictive modeling may modify such values based on additional parameters and/or other data affecting the probabilities of the co-occurrence of the content item slots. In some implementations, the predictive modeling may generate and/or update the one or more data tables using Bayesian estimation. In some implementations, a machine learning algorithm may be used, such as a regression learning algorithm. Examples of such regression learning algorithms include, perceptron linear learning, maximum entropy logistic regression, support vector machine (SVM) regression with maximum entropy gradient, descent least-squares stochastic gradient, etc. In some implementations, a predictive model may correspond to a particular resource and/or a particular publisher. In some implementations, the table database 470 may be omitted and the predictive modeling may occur responsive to each request.

The data stored in the content item database 480 may include data to effect presentation of one or more content items. The data can include graphical data, textual data, image data, audio data, video data, etc. The data stored in the content item database 480 may include unique identifiers associated with the data such that the content item selection service 450 can use the unique identifiers during the auction process and then access the corresponding data based on the selected unique identifier.

Figure 5:
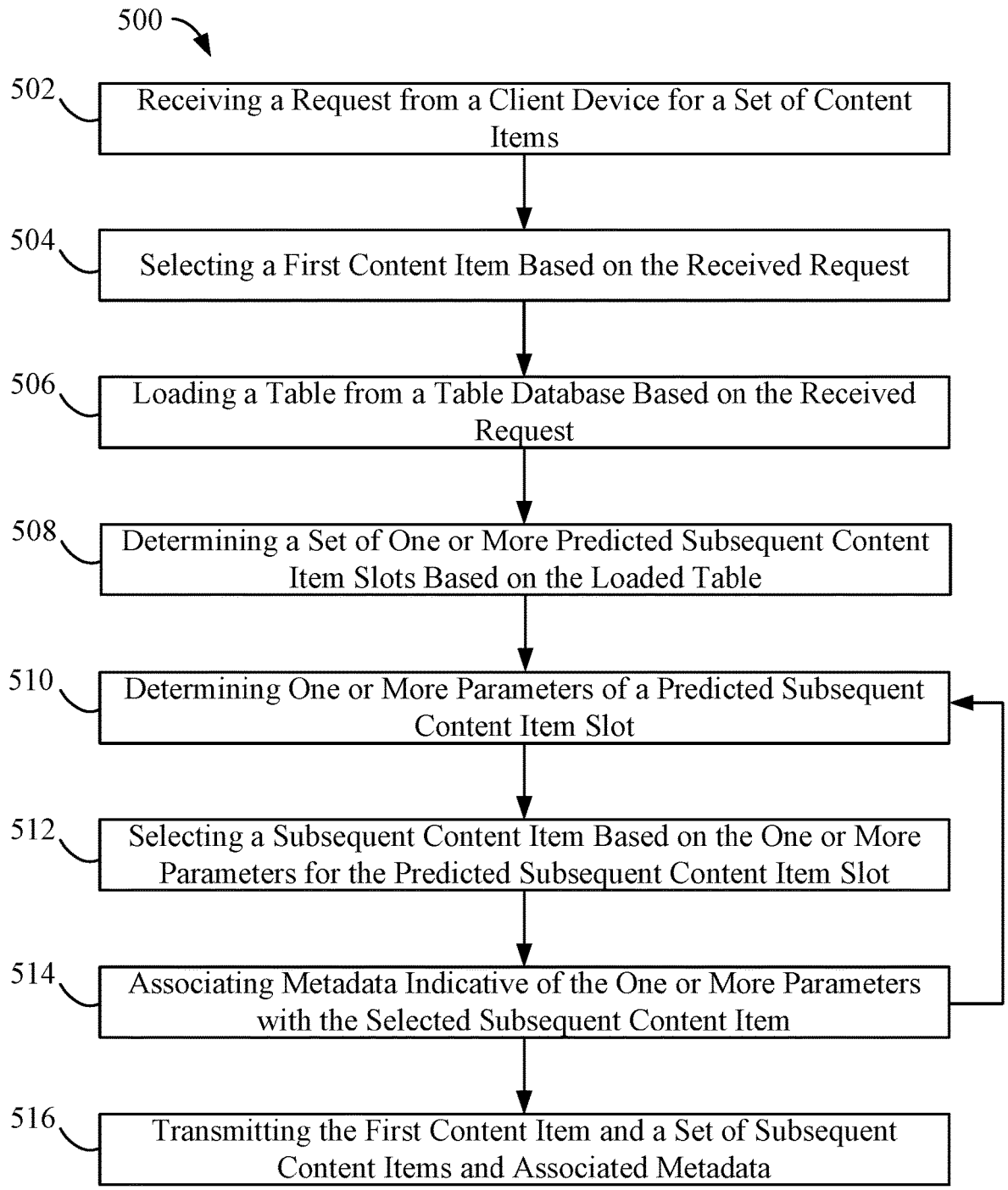
FIG. 5 is a process diagram depicting a process for the content item selection system for selecting and serving a set of content items based on predictive modeling of subsequent content item slots.

FIG. 5 depicts a process 500 that may be implemented by content item selection system 108 for selecting and serving a set of content items based on predictive modeling of subsequent content item slots. The process 500 includes receiving a request from a client device for a set of content items (block 502). The request from the client device can be responsive to execution of an executable script that transmits the request for a content item for a first content item slot of a resource to the content item selection system for a first content item to be selected based on one or more parameters of the first content item slot, the resource content, the resource, and/or data associated with the client device. In some implementations, the one or more parameters may be appended to a content item request URL (e.g., contentitem.item/page/contentitem?devid=abc123 &devnfo=A34r0&resnfo=N6F2w). The request for the first content item slot can further include a parameter with the content item request to indicate that one or more serialized content items are requested for the resource (e.g., &SerCont=1).

The process 500 also includes selecting a first content item based on the received request (block 504). The content item selection service, such as content item selection service 450 of FIG. 4, can select a first content item based on one or more parameters of the first content item slot, the resource content, the resource, and/or data associated with the client device that are received with the content item request. The content item selection service is configured to perform an auction to generate one or more values for one or more content items based, at least in part, on the parameters of the content item request and select a first content item to be served. In some instances, the content item selection service ranks the values (e.g., highest to lowest) and selects the content item associated with a value based on the ranking (e.g., selecting the content item associated with the highest ranked value).

The process 500 also includes loading a table from a table database based on the received request (block 506). The data tables of the table database may be generated using a predictive model and based on browsing session history data stored in a browsing sessions history database. The data tables are indexed based on a document object model position for a corresponding content item slot and a URL for the corresponding page pair and/or the document object model position for a corresponding content item slot and a publisher ID pair. Other indexes for the data tables may be used as well. Thus, loading a table from the table database may include selecting a table based on the URL and/or publisher identifier for the resource for which the content item is to be served.

The process 500 includes determining a set of one or more predicted subsequent content item slots based on the loaded table (block 508). The loaded data table or other data structure is indexed by an indexing value that can include a document object model position of the first content item slot and a uniform resource locator of the resource for the initial content item request (e.g., the indexing value may be [DOM_position, URL]). In other implementations, the indexing value can include a document object model position of the first content item slot and an identifier for the publisher (e.g., [DOM_position, Publisher_ID]). The document object model position of the first content item slot is received as part of the request and is used, in conjunction with a URL of publisher identifier that are also included in the request, to identify the corresponding data in the data table. The data for the data table includes data indicative of the likelihood of co-occurrences of subsequent content item slots with the first content item slot for the given URL or publisher identifier. That is, based on previously received browsing session history and/or page view data, a predictive model is used to calculate a numerical value for the likelihood of the co-occurrence of a given subsequent content item slot of the previously received browsing session history and/or page view data when the first content item slot is present. Thus, the data includes a percentage and/or numerical value indicative of the probability of a corresponding content item slot occurring with the indexed document object model positioned content item slot. The numerical value indicative of the probability may have a numerical value between 0 and 1, inclusive.

In some implementations, determining the set of one or more predicted subsequent content item slots may include filtering out data for predicted subsequent content item slots that do not meet and/or exceed a predetermined threshold value. For instance, the predetermined threshold value may be 0.7 or 70% such that any predicted subsequent content item slots with a predicted co-occurrence value below 0.7 or 70% are filtered out to result in a set of one or more subsequent content item slots. The predetermined threshold value may be any value from 0 to 1.0, inclusive. In other implementations, the set of one or more predicted content item slots may include all predicted subsequent content item slots for the given index without filtering based on a predetermined threshold value.

The process 500 further includes determining one or more parameters of a predicted subsequent content item slot (block 510). In some implementations, the data table can include parameters associated with each of the one or more predicted content item slots. The parameters include the block level parameters, which are the parameters specific to the subsequent content item slot (e.g., dimensions of the content item slot, etc.) and do not include the page level parameters (e.g., page specific formatting). That is, the data table may include one or more parameters associated with the subsequent content item slot from the browsing session and/or page view data that is used to develop the data table, as will be described in greater detail herein. In other implementations, the one or more parameters for the subsequent content item slot of the data table may be stored in a separate data table and can be retrieved based on an identifier of the subsequent content item slot. For each predicted subsequent content item slot of the set of one or more predicted content item slots, the system can retrieve the parameters from the data table to be used in selecting a content item for the predicted subsequent content item slot.

In some implementations, the one or more parameters and the one or more predicted subsequent content item slots may be determined directly from the browsing session history and/or page view data without the data table.

The process 500 includes selecting a subsequent content item based on the one or more parameters for the predicted content item slot (block 512). The content item selection service is also configured to perform an auction for the predicted content item slot. To select the subsequent content item for a predicted subsequent content item slot, the content item selection service uses the block level one or more parameters of a predicted subsequent content item slot with the page level parameters (e.g., resource content parameters, resource parameters, etc.) and any client device parameters from the first content item request. In some implementations, the auction for the first content item slot and one or more of the auctions for the predicted content item slots can occur at substantially the same time, e.g., in parallel. The content item selection service generates one or more values for one or more candidate subsequent content items based, at least in part, on the parameters of the predicted content item slot, and selects a subsequent content item for the predicted subsequent content item slot. In some instances, the content item selection service ranks the values (e.g., highest to lowest) and selects the content item associated with a value based on the ranking (e.g., selecting the content item associated with the highest ranked value).

The process 500 also includes associating metadata indicative of the one or more parameters with the selected subsequent content item (block 514). For the client device to match the selected subsequent content item to a subsequent content item slot of the resource as the resource is being loaded, the parameters of the predicted subsequent content item slot for which the subsequent content item is selected are included in metadata for the served subsequent content item. The one or more parameters may be directly included in the metadata for the subsequent content item or the one or more parameters may be encoded before being included in the metadata.

If there are additional predicted content item slots to be filled, then the process 500 may return to determine the one or more parameters for the next predicted subsequent content item slot (block 510). In some implementations, steps 510, 512, and 514 may occur at substantially the same time for each predicted subsequent content item slot, e.g., in parallel, and may also occur at substantially the same time as the selecting of the first content item (block 504).

The process 500 further includes transmitting the first content item and s set of subsequent content items and associated metadata (block 516). In some implementations, the first content item and the set of selected subsequent content items and associated metadata can be sent as a single set of data responsive to the first content item request. In other implementations, the first content item may be sent responsive to the first content item request as soon as the first content item is selected and the set of selected subsequent content items, if selected after the first content item, and the associated metadata can be sent separately from the first content item.

In some implementations, the process 500 may omit loading a table and may instead load browsing session history data and/or page view data from the browsing session history database to be used with a predictive model to generate the data stored in the table on a per request basis.

Figure 6:
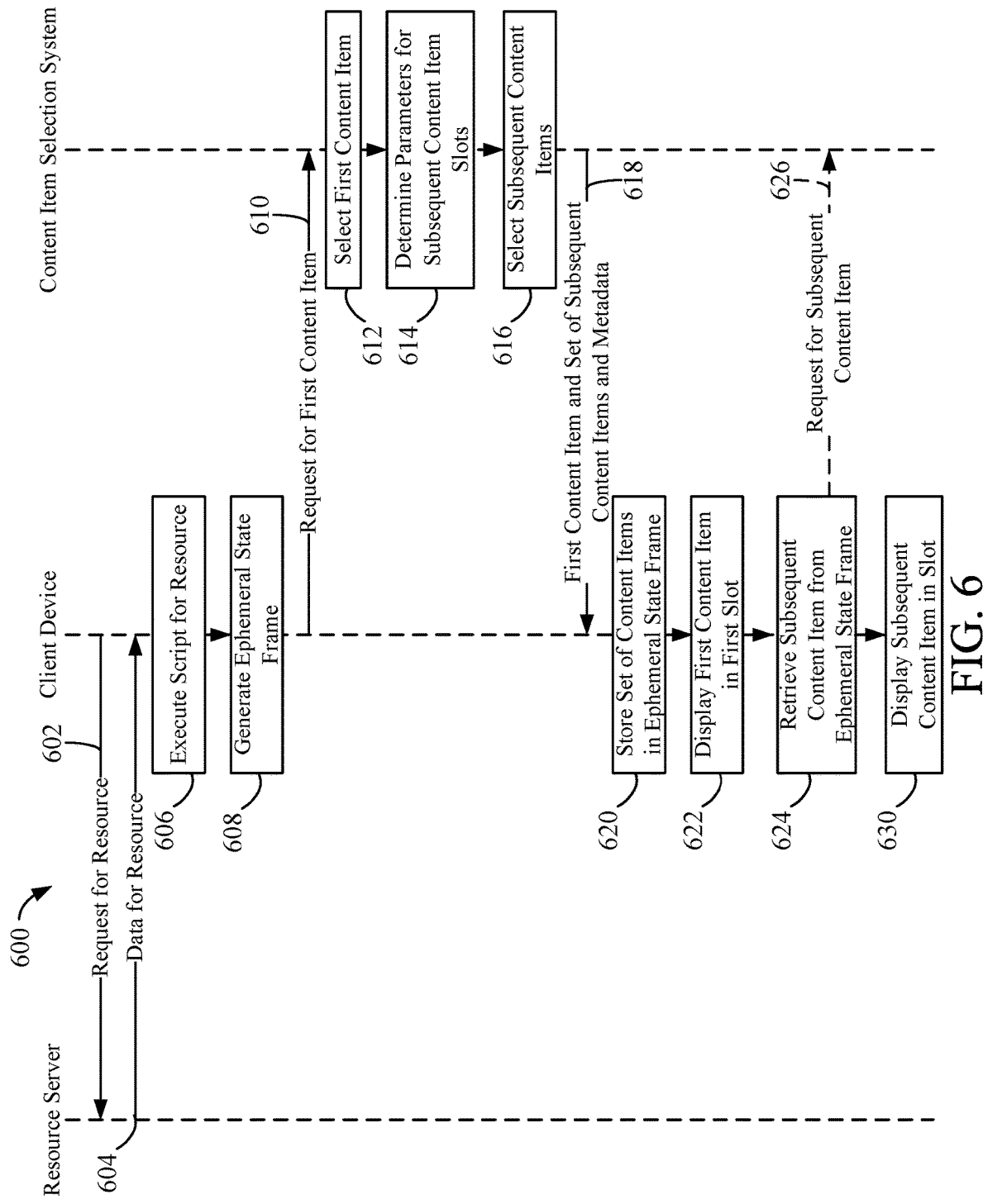
FIG. 6 is a process diagram depicting a process for displaying a set of content items with a resource based on predictive modeling of subsequent content item slots.

FIG. 6 depicts an overview of the process 600 for displaying a set of content items with a resource based on predictive modeling of subsequent content item slots. The process 600 includes a client device transmitting a request for a resource 602 to a resource server. In some instances, the request for the resource from the resource server can be transmitted from a web browser executing on the client device when a user enters a URL into the web browser. In other instances, the request for the resource from the resource server can be transmitted from another application executing on the client device responsive to an input (e.g., a selection of a button, an opening of the application, etc.).

Responsive to the request, the resource server transmits data for the resource 604 to the client device. The data for the resource can include first-party content, such as a publishers content, executable code, such as scripts, third-party content, etc. The client device receives the data for the resource from the resource server over a data network and begins to process the data for display of the resource in accordance with the received data.

The process 600 also includes executing a script for the resource 606. As the data for the resource is processed by one or more processors of the client device, the data for the resource may contain a script or other executable instruction that is executed by the client device. For instance, the data for the resource may include one or more content item slots in which third-party content may be displayed with the content of the resource. The execution of the script may be a single script for the resource (e.g., a single script that is initially executed) and/or the execution of the script may occur for each one or more of the one or more content item slots (e.g., each of the one or more content item slots includes a call to a script).

The process 600 further includes generating an ephemeral state frame 608. In some implementations, the execution of the single script may generate the ephemeral state frame as the resource is loading. In other implementations, the script called by one or more of the content item slots may generate the ephemeral state frame. In still other implementations, a script returned as part of an HTML document responsive to a first content item request may generate the ephemeral state frame.

The generated ephemeral state frame is a cacheable frame in which a received set of subsequent content items and associated metadata are stored and used to fill one or more subsequent content item slots of the resource without needing a separate request to be transmitted to the content item selection system from the client device. In some implementations, the ephemeral state frame is an iframe such that the stored set of subsequent content items and associated metadata are accessible only by executable script called by the one or more subsequent content item slots.

As the data for the resource is processed by the client device, the process 600 includes transmitting a request to a content item selection system 610. The request can be transmitted responsive to the execution of the script for the resource. When a first content item slot is encountered during processing of the data for the resource, a script called by the first content item slot causes the client device to transmit the request to the content item selection system. The first content item slot may include parameters specific to the first content item slot (e.g., block level parameters) to be included in the request. The script may also include additional parameters with the request, such as parameters associated with the resource and/or content of the resource, parameters associated with the client device, etc. The parameters may be appended to a content item request URL (e.g., contentitem.item/page/contentitem?devid=abc123&devnfo=A34r0&resnfo=N6F2w) for an image request or other request transmitted to the content item selection system.

The content item selection system receives the transmitted request and selects a first content item 612 based on the parameters included in the transmitted request, such as on one or more parameters of the first content item slot, the resource content, the resource, and/or data associated with the client device. A content item selection service of the content item selection system is configured to perform an auction to generate one or more values for one or more content items based, at least in part, on the parameters of the content item request, and select a first content item to be served. In some instances, the content item selection service ranks the values (e.g., highest to lowest) and selects the content item associated with a value based on the ranking (e.g., selecting the content item associated with the highest ranked value).

In addition to selecting a first content item responsive to the request, the content item selection system is also configured to determine a set of one or more predicted subsequent content item slots based on the parameters of the first content item request and to select one or more subsequent content items for the set of one or more predicted subsequent content item slots.

In some implementations, the process 600 can include loading a table from a table database based on the received request. The data tables of the table database may be generated using a predictive model and based on browsing session history data stored in a browsing sessions history database. The data tables are indexed based on a document object model position for a corresponding content item slot and a URL for the corresponding page pair and/or the document object model position for a corresponding content item slot and a publisher ID pair. Thus, loading a table from the table database may include selecting a table based on the URL and/or publisher identifier for the resource for which the content item is to be served.

A set of one or more predicted subsequent content item slots based on the loaded table can be determined based on an indexing value. The indexing value for the data table can include a document object model position of the first content item slot and a uniform resource locator of the resource for the initial content item request (e.g., the indexing value may be [DOM_position, URL]). In other implementations, the indexing value can include a document object model position of the first content item slot and an identifier for the publisher (e.g., [DOM_position, Publisher_ID]). The data for the data table includes data indicative of the likelihood of co-occurrences of subsequent content item slots with the first content item slot for the given URL or publisher identifier based on the document object position of the first content item slot for the resource. The data indicative of the likelihood of co-occurrences may include a percentage and/or numerical value indicative of the probability of a corresponding content item slot occurring with the first content item slot. The numerical value indicative of the probability may have a numerical value between 0 and 1, inclusive.

In some implementations, determining the set of one or more predicted subsequent content item slots may include filtering out data for predicted subsequent content item slots that do not meet and/or exceed a predetermined threshold value. For instance, the predetermined threshold value may be 0.7 or 70% such that any predicted subsequent content item slots with a predicted co-occurrence value below 0.7 or 70% are filtered out to result in a set of one or more subsequent content item slots. The predetermined threshold value may be any value from 0 to 1.0, inclusive. In other implementations, the set of one or more predicted content item slots may include all predicted subsequent content item slots for the given index without filtering based on a predetermined threshold value.

Based on the set of one or more predicted subsequent content item slots, the process 600 includes determining one or more parameters for each predicted subsequent content item slot 614. In some implementations, the data table can include parameters associated with each of the one or more predicted content item slots. The parameters include the block level parameters, which are the parameters specific to the subsequent content item slot (e.g., dimensions of the content item slot, etc.) and do not include the page level parameters (e.g., page specific formatting). That is, the data table may include one or more parameters associated with the subsequent content item slot from the browsing session and/or page view data that is used to develop the data table. In other implementations, the one or more parameters for the subsequent content item slot of the data table may be stored in a separate data table and can be retrieved based on an identifier of the subsequent content item slot. For each predicted subsequent content item slot of the set of one or more predicted content item slots, the system can retrieve the parameters from the data table to be used in selecting a content item for the predicted subsequent content item slot. In some implementations, the one or more parameters and the one or more predicted subsequent content item slots may be determined directly from the browsing session history and/or page view data without the data table.

The process 600 further includes selecting subsequent content items for each of the one or more predicted subsequent content item slots based on one or more parameters for each of the one or more predicted content item slots 616. The content item selection service also performs an auction for each of the predicted content item slots. To select the subsequent content item for a predicted subsequent content item slot, the content item selection service uses the block level one or more parameters of a predicted subsequent content item slot with the page level parameters (e.g., resource content parameters, resource parameters, etc.) and any client device parameters from the first content item request. In some implementations, the auction for the first content item slot and one or more of the auctions for the predicted content item slots can occur at substantially the same time, e.g., in parallel. The content item selection service generates one or more values for one or more candidate subsequent content items based, at least in part, on the parameters of the predicted content item slot, and selects a subsequent content item for a corresponding predicted subsequent content item slot of the auction. In some instances, the content item selection service ranks the values (e.g., highest to lowest) and selects the content item associated with a value based on the ranking (e.g., selecting the content item associated with the highest ranked value).

The process 600 also includes associating metadata indicative of the one or more parameters with each selected subsequent content item for a corresponding predicted subsequent content item slot. The block level parameters of a predicted subsequent content item slot used for the auction for which the subsequent content item is selected are included in metadata for the served subsequent content item. The one or more parameters may be directly included in the metadata for the subsequent content item or the one or more parameters may be encoded before being included in the metadata.

The first content item and the set of subsequent content items and corresponding metadata for each of the set of subsequent content items are transmitted back to the client device 618 responsive to the request 610. In some implementations, the first content item and the set of selected subsequent content items and associated metadata can be transmitted as a single set of data responsive to the first content item request 610. In other implementations, the first content item may be transmitted responsive to the first content item request as soon as the first content item is selected and the set of selected subsequent content items, if selected after the first content item, and the associated metadata can be transmitted separately from the first content item.

The client device receives the first content item, the set of subsequent content items, and corresponding metadata for each of the set of subsequent content items and stores the set of content items and associated metadata in the generated ephemeral state frame 620. The client device displays the first content item in the first content item slot 622 as the resource is displayed on the client device.

As the client device processes the data for the resource and a subsequent content item slot is processed, the subsequent content item slot can make a call to the script of the resource for a content item to fill the content item slot. Instead of directly sending a request to the content item selection system for a content item, the script can query the ephemeral state frame to determine if a subsequent content item of the set of subsequent content items stored in the ephemeral state frame can be used to fill the subsequent content item slot. The script can query the ephemeral state frame with the parameters for the subsequent content item slot to determine if the metadata of a subsequent content item matches or substantially matches the parameters of the subsequent content item slot.

In some implementations, the comparison may compare a prioritized set of parameters (e.g., unique slot identifier parameters, dimension parameters, etc.) to initially include and/or exclude non-conforming predicted subsequent content items. In other implementations, the comparison may compare all the parameters of the subsequent content item slot to all the parameters of the metadata. In some implementations, the subsequent content item will match or substantially match if all the parameters of the metadata match at least some of the parameters for the subsequent content item slot (e.g., the number of parameters for the subsequent content item slot may be less than the number of parameters for the metadata). In some instances, the subsequent content item will match or substantially match if a certain set of one or more parameters of the metadata (e.g., dimensions of the predicted subsequent content item slot, etc.) match corresponding parameters for the subsequent content item slot even if some parameters of the metadata do not match. In some further instances, the subsequent content item will match or substantially match if a predetermined threshold number of one or more parameters of the metadata match corresponding parameters for the subsequent content item slot even if some parameters of the metadata do not match.

If the metadata of a subsequent content item matches or substantially matches the parameters of the subsequent content item slot, then the data for the matching subsequent content item is retrieved from the ephemeral state frame 624 and is displayed in the corresponding subsequent content item slot of the resource 630. If the metadata of a subsequent content item does not match or substantially match the parameters of the subsequent content item slot, then the executed script causes the client device to transmit a request to the content item selection system with the parameters for the subsequent content item slot for a content item to be displayed in the subsequent content item slot 626.

Figure 7:
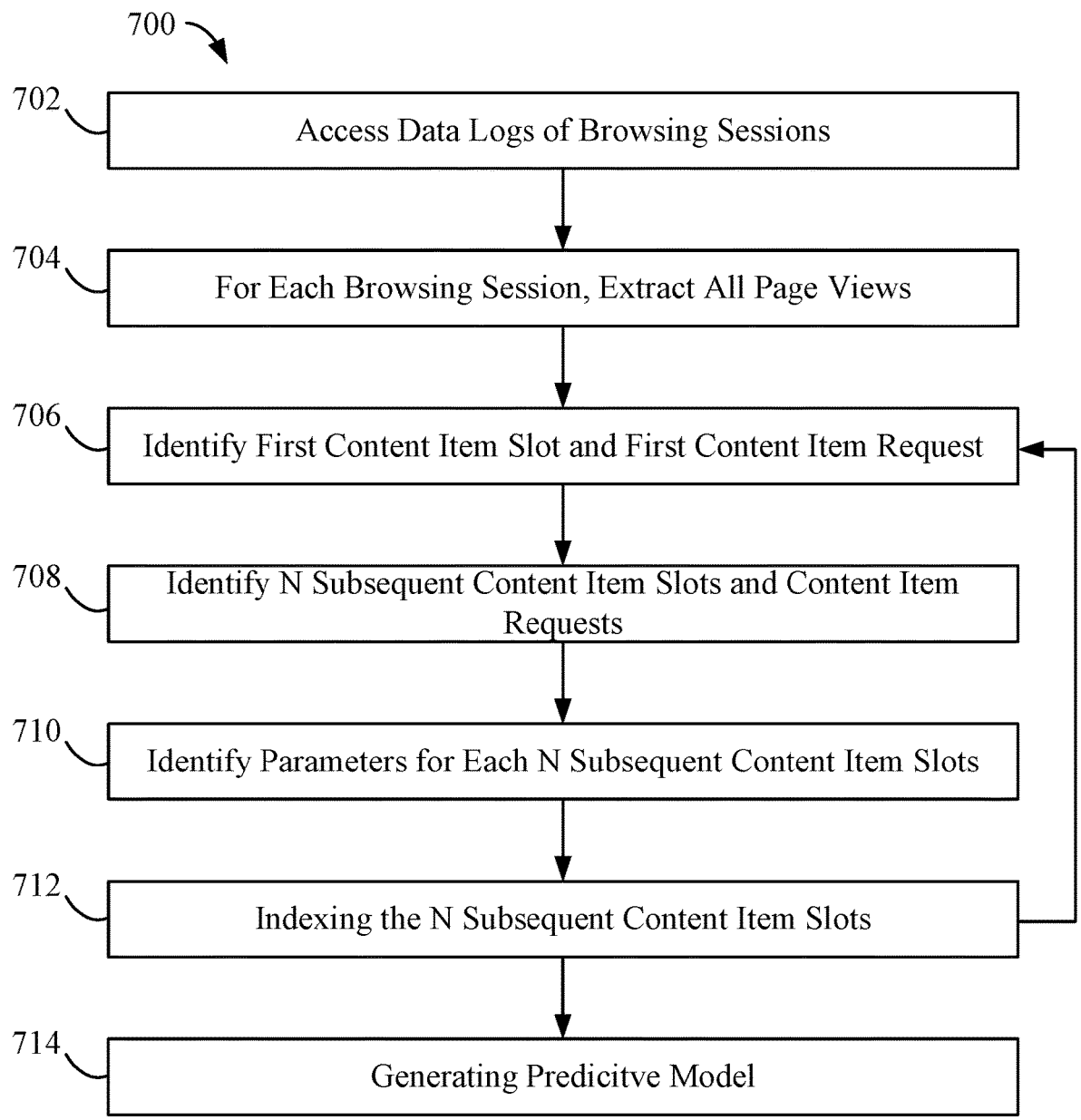
FIG. 7 is process diagram depicting a process for generating predictive modeling data using a predictive model and browsing session data logs.

FIG. 7 depicts a process 700 that may be implemented by the content item selection system, such as content item selection system 108 of FIGS. 1 and 4, for generating predictive modeling data using a predictive model and browsing session data logs. The process 700 includes accessing data logs of browsing sessions (block 702). The data logs may be stored in a session history database that includes data for one or more browsing session history logs with data for one or more page views. In some implementations, the browsing session history logs may be limited to those within a predetermined look-back window (e.g., the past 1 day, 3 days, 5 days, 7 days, 10 days, 15 days, 30 days, etc.).

The process 700 also includes, for each browsing session, extracting all page views (block 704). Extracting the page views may include parsing the browsing session data for when a new page view occurs and extracting the preceding data as a page view. The data for each page view may include data regarding the a publisher identifier, a URL, and parameters for each of the content item slots for the corresponding page (e.g., document object model position, content item slot dimensions, a content item slot unique identifier, settings for the publisher for the page, text color, text font, etc.).

The process 700 also includes identifying a first content item slot and a first content item request (block 706). The identification of the first content item slot may include parsing the page view data to identify the call to a script for a content item request. The identification of the first content item request may include parsing the page view data for the transmitted content item request and/or parsing the call to the script for the parameters for the first content item request. Identifying the first content item slot may also include identifying a document object model position of the first content item slot.

The process 700 further includes identifying N subsequent content item slots and N subsequent content item requests (block 708). The identification of the each subsequent content item slot may include parsing the page view data to identify each subsequent call to a script for a subsequent content item request. The identification of each subsequent content item request may include parsing the page view data for the subsequently transmitted content item request and/or parsing the subsequent call to the script for the parameters for the subsequent content item request. Identifying the subsequent content item slots may also include identifying a document object model positions of each subsequent content item slot.

The process 700 includes identifying the parameters for each N subsequent content item slots (block 710). Identifying the parameters for each N subsequent content item slot can include parsing the calls to the script for the block level parameters for the subsequent content item request that differ from page level and/or client device parameters of the first content item request.

Once the document object model positions for the various content item slots and corresponding parameters have been identified, the process includes indexing the N subsequent content item slots (block 712). Data for the N subsequent content items of the page view may be stored in a data structure and indexed based on the document object model position of the first content item slot and a corresponding URL for the page view or a publisher identifier for the page view. The data structure can include the parameters for each of the N subsequent content item slots or the parameters can be stored in a separate data structure. The identification of the content item slots, requests, and parameters and the indexing can be repeated for each page view.

The data indexed by the document object model position of the first content item slot and a corresponding URL for the page view or a publisher identifier for the page view can be aggregated into aggregated statistical data and used to generate a predictive model (block 714) to predict the probability of co-occurrence of each of the N subsequent content item slots when the first content item slot is in the same document object model position and the URL or publisher identifier is the same. The predictive modeling may use Bayesian estimation. In some implementations, a machine learning algorithm may be used, such as a regression learning algorithm. Examples of such regression learning algorithms include, perceptron linear learning, maximum entropy logistic regression, support vector machine (SVM) regression with maximum entropy gradient, descent least-squares stochastic gradient, etc. In some implementations, a predictive model may correspond to a particular resource and/or a particular publisher.

In some implementations, the generated predictive model can be used to determine that a subsequent content item request is from the same web page or application view. In some implementations, the predictive model may utilize a correlator, such as a time, a cookie or other data structure, and/or a URL as a predictor for aggregating the statistical data.

In some implementations, the subsequent content items may be selected based on the selected first content item. For instance, the subsequent content items may be from the same third-party as the first content item so that content items from the third-party are shown in each of the content item slots of the resource. In some instances, the same third-party may have an increased value (e.g., bid) to have the third-party's content items selected as the subsequent content items to the selected first content item. In some implementations, the subsequent content items may be selected based on a topic of the selected first content item to coordinate content for the selected content items for the resource.

Figure 8:
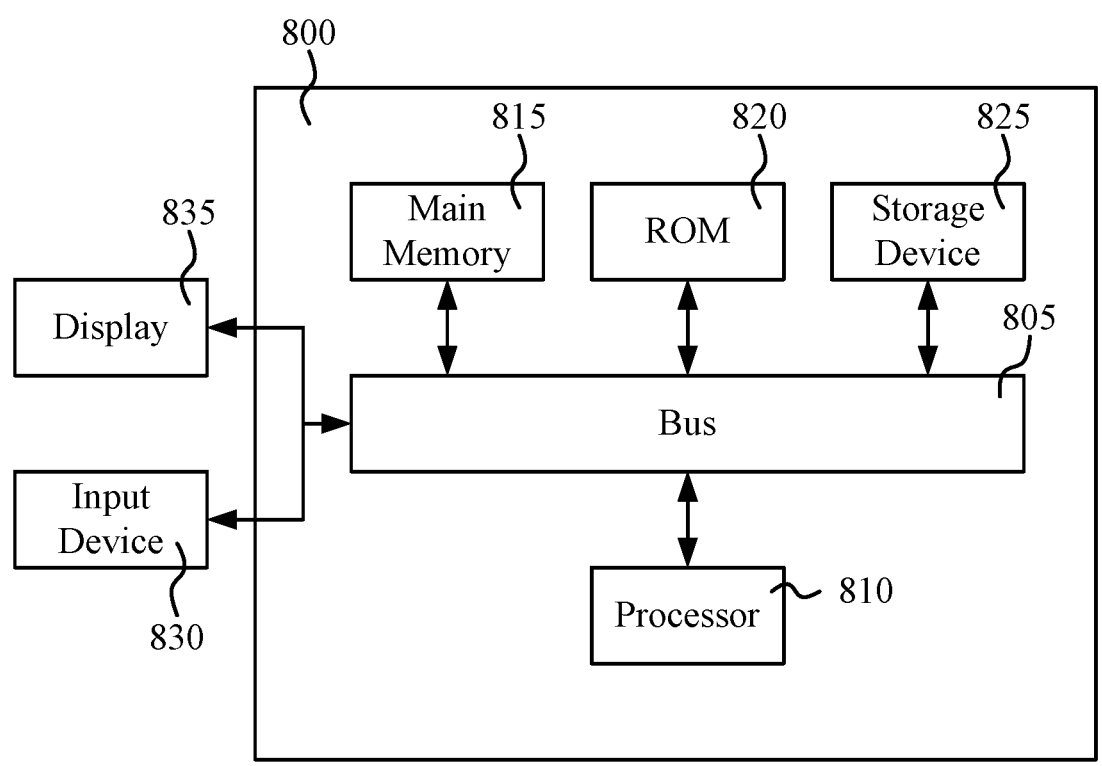
FIG. 8 is a block diagram depicting a general architecture for a computer system that may be employed to implement various elements of the systems and methods described and illustrated herein.

FIG. 8 is a block diagram of a computer system 800 that can be used to implement the client device 110, content item selection system 108, third-party content server 102, resource server 104, etc. The computing system 800 includes a bus 805 or other communication component for communicating information and a processor 810 coupled to the bus 805 for processing information. The computing system 800 can also include one or more processors 810 coupled to the bus for processing information. The computing system 800 also includes main memory 815, such as a RAM or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a ROM 820 or other static storage device coupled to the bus 805 for storing static information and instructions for the processor 810. A storage device 825, such as a solid state device, magnetic disk or optical disk, is coupled to the bus 805 for persistently storing information and instructions. Computing device 800 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 800 may be coupled via the bus 805 to a display 835, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 830, such as a keyboard including alphanumeric and other keys, may be coupled to the bus 805 for communicating information and command selections to the processor 810. In another implementation, the input device 830 may be integrated with the display 835, such as in a touch screen display. The input device 830 can include a cursor control, such as a mouse, a trackball, or cursor direction keys, for communicating direction information and command selections to the processor 810 and for controlling cursor movement on the display 835.

According to various implementations, the processes and/or methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes and/or method steps described herein. One or more processors in a multi-processing arrangement may also be employed to execute the instructions contained in main memory 815. In alternative implementations, hard-wired circuitry may be used in place of or in combination with software instructions to effect illustrative implementations. Thus, implementations are not limited to any specific combination of hardware circuitry and software.

Although an implementation of a computing system 800 has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method, implemented by using one or more processors, comprising:
   receiving a request for a content item for a content item slot of a resource, the request including one or more parameters for the content item slot and a parameter indicating the request is for one or more serialized content items;
   selecting the content item based on the one or more parameters for the content item slot;
   predicting a first subsequent content item slot of a plurality of subsequent content item slots using a predictive model trained by a machine learning algorithm, wherein the predictive model determines a probability of co-occurrence of the first subsequent content item slot and the content item slot based on a position of the content item slot;
   in response to the parameter indicating the request for one or more serialized content items, determining the predicted first subsequent content item slot;
   in response to determining the predicted first subsequent content item slot, determining one or more parameters for the predicted first subsequent content item slot;
   selecting a first subsequent content item for the predicted first subsequent content item slot based on the determined one or more parameters for the predicted first subsequent content item slot; and
   transmitting (i) data to effect presentation of the selected content item, (ii) data to effect presentation of the first subsequent content item for the predicted first subsequent content item slot, and (iii) metadata associated with the first subsequent content item, wherein the metadata comprises the one or more parameters for the predicted first subsequent content item slot.

2. The method of claim 1, comprising modifying a data table associated with the predictive model using Bayesian estimation, wherein the data table comprises (i) an indexing value, (ii) data associated with the content item slot, and (iii) data associated with the predicted first subsequent item slot, wherein the indexing value is based on a uniform resource locator (URL) for the resource.

3. The method of claim 1, comprising modifying a data table associated with the predictive model using Bayesian estimation, wherein the data table comprises (i) an indexing value, (ii) data associated with the content item slot, and (iii) data associated with the predicted first subsequent item slot, wherein the indexing value is based on a publisher identifier for the resource.

4. The method of claim 1, wherein the selecting the content item and the selecting the first subsequent content item are performed in parallel.

5. The method of claim 1, further comprising:
   modifying a data table associated with the predictive model using Bayesian estimation, wherein the data table comprises (i) an indexing value, (ii) data associated with the content item slot, and (iii) data associated with the predicted first subsequent item slot;
   determining a predicted second subsequent content item slot based on the modified data table;
   in response to determining the predicted second subsequent content item slot based on the modified data table, determining one or more parameters for the predicted second subsequent content item; and
   selecting a second subsequent content item for the predicted second subsequent content item slot based on the determined one or more parameters for the predicted second subsequent content item slot.

6. The method of claim 5, wherein the selecting the content item, the selecting the first subsequent content item, and the selecting the second subsequent content item are performed in parallel.

7. The method of claim 1, wherein the content item and the first subsequent content item are from the same third-party.

8. A system comprising:
   one or more processors; and
   one or more storage devices storing instructions that, when executed by the one or more processors, cause the one or more processors to perform operations comprising:

receiving a request for a content item for a content item slot of a resource, the request including one or more parameters for the content item slot and a parameter indicating the request is for one or more serialized content items;

selecting the content item based on the one or more parameters for the content item slot;

predicting a first subsequent content item slot of a plurality of subsequent content item slots using a predictive model trained by a machine learning algorithm, wherein the predictive model determines a probability of co-occurrence of the first subsequent content item slot and the content item slot based on a position of the content item slot;

in response to the parameter indicating the request is for one or more serialized content items, determining the predicted first subsequent content item slot;

in response to determining the predicted first subsequent content item slot, determining one or more parameters for the predicted first subsequent content item slot;

selecting a first subsequent content item for the predicted first subsequent content item slot based on the determined one or more parameters for the predicted first subsequent content item slot; and transmitting (i) data to effect presentation of the selected content item, (ii) data to effect presentation of the first subsequent content item for the predicted first subsequent content item slot, and (iii) metadata associated with the first subsequent content item, wherein the metadata comprises the one or more parameters for the predicted first subsequent content item slot.

9. The system of claim 8, wherein the one or more storage devices store instructions that, when executed by the one or more processors, cause the one or more processors to perform operations further comprising:

generating an ephemeral state frame for the resource; and storing the data to effect presentation of the first subsequent content item for the predicted first subsequent content item slot and the metadata associated with the first subsequent content item in the ephemeral state frame.

10. The system of claim 9, wherein the ephemeral state frame is a HyperText Markup Language (HTML) iframe.

11. The system of claim 9, wherein the ephemeral state frame is generated responsive to execution of a script of the resource.

12. The system of claim 8, wherein the one or more storage devices store instructions that, when executed by the one or more processors, cause the one or more processors to perform operations further comprising:

determining a configuration file is included with data for the resource, the configuration file including a parameter indicating a second subsequent content item is to be returned responsive to the request for the content item, determining the second subsequent content item has not been received; and in response to determining the second subsequent content item has not been received, waiting a predetermined threshold period of time before transmitting a separate request for the second subsequent content item.

13. A non-transitory computer readable storage device storing instructions that, when executed by one or more processors, cause the one or more processors to perform operations comprising:

receiving a request for a content item for a content item slot of a resource, the request including one or more parameters for the content item slot and a parameter indicating the request is for one or more serialized content items;

selecting the content item based on the one or more parameters for the content item slot;

predicting a first subsequent content item slot of a plurality of subsequent content item slots using a predictive model trained by a machine learning algorithm, wherein the predictive model determines a probability of co-occurrence of the first subsequent content item slot and the content item slot based on a position of the content item slot;

in response to the parameter indicating the request is for one or more serialized content items, determining the predicted first subsequent content item slot;

in response to determining the predicted first subsequent content item slot, determining one or more parameters for the predicted first subsequent content item slot;

selecting a first subsequent content item for the predicted first subsequent content item slot based on the determined one or more parameters for the predicted first subsequent content item slot; and transmitting (i) data to effect presentation of the selected content item, (ii) data to effect presentation of the first subsequent content item for the predicted first subsequent content item slot, and (iii) metadata associated with the first subsequent content item, wherein the metadata comprises the one or more parameters for the predicted first subsequent content item slot.

14. The non-transitory computer readable storage device of claim 13, the operations comprising modifying a data table associated with the predictive model using Bayesian estimation, wherein the data table comprises (i) an indexing value, (ii) data associated with the content item slot, and (iii) data associated with the predicted first subsequent item slot, wherein the indexing value is based on a uniform resource locator (URL) for the resource.

15. The non-transitory computer readable storage device of claim 13, the operations comprising modifying a data table associated with the predictive model using Bayesian estimation, wherein the data table comprises (i) an indexing value, (ii) data associated with the content item slot, and (iii) data associated with the predicted first subsequent item slot, wherein the indexing value is based on a publisher identifier for the resource.

16. The non-transitory computer readable storage device of claim 13, wherein the selecting the content item and the selecting the first subsequent content item are performed in parallel.

* * * * *